United States Patent
Voulgaris

[19]

[11] Patent Number: 6,150,960
[45] Date of Patent: *Nov. 21, 2000

[54] INTEGRATED FLIGHT CONTROL INDICATOR

[75] Inventor: Theodore J. Voulgaris, Hudson, Ohio

[73] Assignee: Northrop Grumman Corporation, Los Angeles, Calif.

[*] Notice: This patent is subject to a terminal disclaimer.

[21] Appl. No.: 09/435,666

[22] Filed: Nov. 8, 1999

Related U.S. Application Data

[63] Continuation of application No. 08/558,822, Nov. 16, 1995, Pat. No. 6,028,536.

[51] Int. Cl.⁷ .................................................. G01C 23/00
[52] U.S. Cl. ......................... 340/975; 340/977; 340/978
[58] Field of Search .................................. 340/975, 973, 340/974, 977, 978, 971, 976, 979, 980, 961; 701/7, 9, 4, 6

[56] References Cited

U.S. PATENT DOCUMENTS

| | | | |
|---|---|---|---|
| 2,685,226 | 8/1954 | Crane | 340/973 |
| 3,162,834 | 12/1964 | Schweighofer et al. | |
| 3,188,861 | 6/1965 | Miller | 340/966 |
| 3,500,413 | 3/1970 | Dohogne et al. | 343/107 |
| 3,520,994 | 7/1970 | McAfee et al. | 340/973 |
| 3,970,829 | 7/1976 | Melvin | 235/150.22 |
| 4,040,005 | 8/1977 | Melvin | 73/178 T |
| 4,247,843 | 1/1981 | Miller et al. | 340/973 |
| 4,283,705 | 8/1981 | James et al. | 340/973 |
| 4,326,189 | 4/1982 | Crane | 340/973 |
| 4,419,079 | 12/1983 | Georges et al. | 434/43 |
| 4,563,742 | 1/1986 | McElreath | 340/975 |
| 4,583,094 | 4/1986 | Mosier | 340/975 |
| 4,626,851 | 12/1986 | Tooze | 340/975 |
| 4,903,017 | 2/1990 | Wooler | 340/975 |
| 5,136,301 | 8/1992 | Bechtold et al. | 342/176 |
| 5,179,377 | 1/1993 | Hancock | 340/961 |
| 5,181,028 | 1/1993 | Sharpe et al. | 340/974 |
| 5,212,480 | 5/1993 | Ferro | 340/974 |
| 5,248,968 | 9/1993 | Kelly et al. | 340/961 |
| 5,289,185 | 2/1994 | Ramier et al. | 340/971 |
| 5,357,263 | 10/1994 | Fischer et al. | 340/975 |
| 5,420,582 | 5/1995 | Kubbat et al. | 340/974 |
| 6,028,536 | 2/2000 | Voulgaris | 340/975 |

*Primary Examiner*—Brent A. Swarthout
*Attorney, Agent, or Firm*—Terry J. Anderson; Karl J. Hoch, Jr.

[57] ABSTRACT

An integrated flight control indicator for providing visual information indicative of aircraft flight parameters has a sky arc and an earth arc which are visually distinguishable from one another. The sky arc and the earth arc cooperate to generally define a circle wherein the relative lengths of the sky arc and the earth arc indicate the pitch of the aircraft. A horizon line extends approximately between the two intersections of the sky arc and the earth arc so as to provide a visual indication of the roll of the aircraft. Other indicia are provided for indicating radar or barometric altitude, vertical speed, heading, ground track, minimum altitude break, etc. Thus, the present invention provides a visual indication suitable for use in instrument panel displays, heads-up display, and helmet-mounted displays.

10 Claims, 4 Drawing Sheets

FIG. 21

INTEGRATED FLIGHT CONTROL INDICATOR

This is a continuation patent application of U.S. Ser. No. 08/558,822, filed Nov. 16, 1995, now U.S. Pat. No. 6,028,536.

FIELD OF THE INVENTION

The present invention relates generally to aircraft instrumentation and more particularly to an integrated flight control indicator for providing visual information indicative of aircraft flight parameters which is suitable for use in control panels, heads-up displays, and helmet-mounted displays. The integrated flight control indicator of the present invention is specifically designed to remain functional even when reduced in size, so as to be compatible with helmet-mounted displays and the like, and so as to provide minimal obstruction to a pilot's view. No alpha-numerics are required for basic instrument flight, thus facilitating such reduction in size.

BACKGROUND OF THE INVENTION

Flight control indicators for providing visual information indicative of aircraft flight parameters are well known. Such flight control indicators include artificial horizons (attitude indicators), turn coordinators, heading and ground track indicators, compasses, pitch indicators, radar and barometric altitude indicators, and a variety of other flight control instruments. Such flight control indicators provide the pilot with critical information regarding the attitude and position of the aircraft so as to facilitate flight safety, even during adverse visual conditions.

As those skilled in the art will appreciate, it is not uncommon to rely upon such instrumentation to properly perform critical flight maneuvers. For example, when the horizon cannot be seen, such as during conditions of low visibility, the pilot's senses cannot distinguish between a banked turn and straight and level flight. In either case, gravity and/or centrifugal force act upon the pilot in a direction normal to the pilot's seat, thus potentially leading the pilot to believe that the aircraft is flying straight and level even when the aircraft is in a banked turn. As those skilled in the art are aware, relying solely upon the pilot's senses has, in the past, led to fatal aircraft crashes.

It is also known to integrate a plurality of such flight control indicators in an attempt to provide a compact and easily read device. U.S. Pat. Nos. 5,250,947; 5,248,968; 5,212,480; 5,136,301; 4,903,017; 4,626,851; 4,583,094; 4,563,742; 4,326,189; 4,419,079; 4,283,705; 4,040,005; 3,970,829; 3,520,994; 3,500,413; 3,162,834 and 2,685,226 disclose examples of such integrated devices.

As those skilled in the art will appreciate, there has been a definite trend in the art during recent years toward the development of heads-up displays wherein the flight control indicators are projected in such a manner as to allow the pilot to view such indicators without lowering his head. Further, it is desirable to provide an integrated heads-up flight control indicator wherein the important individual indicators are integrated into a single display for quick reference.

When using such a heads-up display, the pilot's attention is not momentarily distracted from the field of view. Such momentary distraction is particularly undesirable in military situations, wherein it is critical to continually observe one's surroundings. It is also advantageous to utilize such a heads-up display in many civilian applications. For example, when flying any aircraft at low altitudes, it is very desirable to maintain continuous surveillance of the terrain so as to avoid a collision with upstanding structures, i.e., buildings, radio towers, etc., and natural formations, i.e., mountains, trees, etc. Even the momentary distraction associated with checking the instrument panel has the potential for causing a catastrophe.

Although some of the displays disclosed by the cited prior art patents may appear to be suitable for use as flight control indicators for heads-up displays, it is important to recognize that a properly designed heads-up display will exhibit certain desirable characteristics, which are lacking in such contemporary devices. Most importantly, a properly designed heads-up display will be simple in construction such that it does not distract the pilot from normal viewing through the aircraft canopy or helmet visor and such that the desired information displayed thereby may readily be ascertained. Thus, the indicator must contain the appropriate number of elements which are required to convey the desired information. Any extraneous elements merely unnecessarily complicate the display and distract attention away from those elements which provide crucial information, as well as distract attention away from normal observation through the canopy or helmet visor.

In this respect, it is desirable that the number and configuration of elements be optimized to most effectively and efficiently convey the desired information. It is thus also desirable that elements of the flight control indicator serve a plurality of different indicating functions, where possible.

SUMMARY OF THE INVENTION

The present invention specifically addresses and alleviates the above-mentioned deficiencies associated with the prior art. More particularly, the present invention comprises an integrated flight control indicator for providing useful information indicative of aircraft flight parameters. In a first embodiment, the integrated flight control indicator comprises a sky arc and an earth arc visually distinguishable from the sky arc. The sky arc and the earth arc cooperate to generally define a circle. The relative lengths of the sky arc and the earth arc indicate the pitch of the aircraft.

The sky arc and the earth arc, along with all other indicia which form the integrated flight control indicator of the present invention, provide a visual indication suitable for use in instrument panel displays, heads-up displays, and helmet-mounted displays. As those skilled in the art will appreciate, the sky arc, earth arc, and other indicia may be formed by a variety of different means. For example, a cathode ray tube (CRT) may be utilized to form the sky arc, earth arc, and other indicia. The CRT may be used directly in an instrument panel display, or may be reflected or projected to form a heads-up display or helmet-mounted display. The integrated flight control display of the present invention may be formed by various different computer controlled projection means.

The sky arc and the earth arc are preferably formed of different colors so as to be visually distinguishable from one another. Similarly, the various other indicia, as discussed below, may be formed of various different colors so as to facilitate their being distinguished from one another. Alternatively, the sky arc and the earth arc are formed of different line thicknesses so as to be visually distinguishable from one another and the other indicia are formed to be distinguishable in a similar manner.

The integrated flight control indicator of the present invention preferably further comprises an aircraft symbol which is locked in relative orientation to the aircraft centerline, such that the sky arc and earth arc rotate relative thereto during roll maneuvers. The aircraft symbol preferably further comprises a pitch dot formed generally in the center thereof so as to facilitate a more precise indication thereby.

The integrated flight control indicator preferably further comprises a horizon line extending approximately between the two intersections of the sky arc and the earth arc, so as to provide a visual indication of the pitch of the aircraft. The horizon line will be positioned above the aircraft symbol when the airplane is in a nose-down attitude and will be below the aircraft symbol when the aircraft is in a nose-up attitude. The horizon line will be superimposed over the pitch dot when the aircraft is in a level or zero pitch attitude. Thus, the combination of the sky arc, earth arc, and horizon line, taken together, provide an instant, easily discernible, indication of the roll and pitch attitudes of the aircraft. This information is provided in a format which is immediately accessible by a pilot in a manner which is clear and unambiguous.

The integrated flight control indicator preferably further comprises bank angle markers extending a short distance radially inward from the two intersections of the sky arc and the earth arc to the two ends of the horizon line. The angle between the bank angle markers and the horizon line varies with the pitch of the aircraft such that during level flight the bank angle markers are colinear with the horizon line, during pitch down the bank angle markers angle up from the horizon line, and during pitch up the bank angle markers angle down from the horizon line. Thus, the bank angle markers provide a further visual indication of the pitch angle of the aircraft, thereby making pitch angle even more readily discernible.

The bank angle markers also provide a marker or index point for a numerical display of the bank angle of the aircraft. The numerical bank angle display is preferably deactivated by default, so as to reduce clutter. It must specifically be activated by the pilot in order to be displayed. The numerical display of the bank angle of the aircraft is formed proximate one of the bank angle markers. The bank angle marker by which the numerical display of the bank angle is formed is that particular bank angle marker corresponding to the lowermost wing of the aircraft. This provides an instantly discernible and precise indication of the roll angle or the angle at which the aircraft is banked and also provides a further visual cue as to which wing is lowermost.

A numerical display of the pitch angle of the aircraft is preferably disposed proximate the circle formed by the sky arc and the earth arc, preferably immediately to the right thereof. The numerical display of the pitch angle preferably comprises a tape display wherein a series of sequential pitch angles are configured as a reel of tape and the numbers scroll past an index mark which points to the pitch angle corresponding to that of the aircraft pitch, in the manner of a contemporary tape display. The tape display may optionally be disabled, so as to reduce clutter, i.e., simplify the integrated flight control indicator.

The integrated flight control indicator of the present invention preferably further comprises an earth line formed below the aircraft symbol and generally parallel to the horizon line. A numerical display of the altitude of the aircraft is preferably formed upon the earth line. The numerical display of altitude is optionally followed by the letter R when radar altitude is selected and letter B when barometric altitude is selected. Those skilled in the art will appreciate that various other indicia may alternatively be utilized, so as to indicate the selection of either radar or barometric altitude.

A vertical rate indicator symbol is formed intermediate the earth line and the aircraft symbol. According to the preferred embodiment of the present invention, the vertical rate indicator symbol comprises an inverted V which moves vertically between the earth line and the aircraft symbol along a vertical line extending therebetween at a rate which is representative of the vertical climb or descent rate of the aircraft.

The distance between the aircraft symbol and the vertical rate indicator symbol is preferably indicative of the aircraft's position within pilot preset altitude limits. Thus, an upper attitude limit is indicated by the point of the vertical rate indicator symbol being disposed upon the bottom of the earth arc (or the sky arc, if the aircraft is an inverted orientation) and a lower altitude limit is indicated by the earth line contacting the aircraft symbol. A further desired minimum altitude is indicated by the point of the vertical rate indicator symbol contacting the aircraft symbol. Thus, upper and lower predetermined altitude limits, as well as a desired minimum altitude, are indicated by the relative positions of the aircraft symbol, the earth line, and the vertical rate indicator symbol, as discussed in further detail below.

A break-altitude symbol is optionally formed within the circle defined by the sky arc and the earth arc, preferably overlaying the aircraft symbol to indicate that the aircraft has descended below a preset minimum altitude. The break-altitude symbol preferably comprises a flashing X, preferably red, so as to immediately draw the attention of the pilot. The break-altitude symbol may be utilized to indicate that the aircraft has descended below a safe or authorized altitude, and thus requires immediate action from the pilot. The break-altitude symbol preferably remains in place and continues to flash until the aircraft ascends above the preset minimum altitude. Alternatively, the break-altitude indicator may be manually disabled.

Additionally, a heading and ground track indicator is preferably formed proximate the circle formed by the sky arc and the earth arc, preferably immediately thereabove. The heading and ground track indicator preferably comprises a comparatively small circle disposed proximate the comparatively larger circle formed by the sky arc and the earth arc. The heading and ground track indicator preferably comprises an indication of north formed thereon and an indication of aircraft heading relative to north formed thereon, as well. According to the preferred embodiment of the present invention, a numerical display of the aircraft heading is formed within the comparatively small circle of the heading and ground track indicator and the indication of north preferably comprises an arrow or index mark extending radially outward from the heading and ground track circle. Preferably, the letter N is formed proximate the arrow. Optionally, an indication of the other compass directions, e.g., south, east, and/or west, are likewise provided.

The indication of the aircraft's heading preferably comprises an arrow or index mark formed within the heading and ground track circle and directed radially outward. The heading and ground track display preferably further comprises a numerical display of the difference between the aircraft heading and the aircraft ground track. The numerical display of the difference is preferably formed proximate the numerical display of the aircraft heading, preferably therebelow. A plus formed to the left of the difference display indicates that the number displayed must be added to the aircraft heading to obtain aircraft ground track and a minus displayed to the left of the numerical difference indicates that the number must be subtracted from the aircraft heading to obtain the aircraft ground track.

The indication of north preferably comprises a north-south line defined by first and second diametrically opposed index marks or outwardly pointing arrows extending radially from the head and ground track circle. The first index mark has an N formed proximate thereto and the second index mark has an S formed proximate thereto to indicate the north and south directions, respectively. The indication of the aircraft heading preferably comprises a index mark or outwardly pointing arrow formed within the heading and ground track circle. The north-south line is rotatable around the heading and ground track indicator circle and the heading index is stationary relative to the ground track indicator circle, so as to provide an indication of heading. The rate that the north-south line rotates around the heading and ground track indicator circle is proportional to aircraft's turn rate, so as to provide a visual indication thereof. The north-south line also provides a visual indication of north, i.e., provides compass directions.

In a second embodiment of the present invention, terrain following/avoidance is facilitated. A flight path marker, preferably configured generally similar to the aircraft symbol of the first embodiment of the present invention, provides an indication of the flight path. The aircraft is on the desired flight path when the aircraft symbol, which is locked to the aircraft centerline, is aligned with the flight path marker. The pilot can easily adjust the flight path of the aircraft to the desired flight path by merely moving the aircraft such that the stationary aircraft symbol aligns with the flight path marker.

For example, if the flight path marker is below and to the left of the stationary aircraft symbol, then the pilot merely maintains a nose-down attitude and banks to the left until the stationary aircraft symbol is aligned with the flight path marker. Thus, the pilot can easily maintain the aircraft on a course in accordance with terrain following/avoidance equipment.

According to a third embodiment of the integrated flight control indicator of the present invention, Instrument Landing System (ILS) symbology is added to terrain following/avoidance symbology, so as to facilitate an instrument landing approach. The instrument landing symbology comprises a heading and glide slope indicator which, in a manner similar to the flight path marker of the second embodiment of the present invention, provides a visual indication of the aircraft heading and altitude relative to the desired glide slope. According to the third embodiment of the present invention, the heading and glide slope indicator comprises a circle which is comparatively smaller than the circle defined by the sky arc and earth arc and which is constrained to stay within the circle defined by the sky arc and earth arc and is damped to prevent erratic motion thereof. Thus, during an ILS approach, the pilot merely maneuvers the aircraft such that the stationary aircraft symbol remains generally centered within the ILS flight path marker in a fashion similar to that of the terrain following/avoidance procedure discussed above.

A minimum altitude marker and numeric display are preferably also provided, along with a numeric display of aircraft altitude.

According to the third embodiment of the present invention, the pitch numeric tape of the first and second embodiments thereof is replaced with an angle-of-attack numeric tape.

Thus, the present invention provides an integrated flight control indicator for providing visual information indicative of aircraft flight parameters. The present invention is suitable for use in control panels, heads-up displays, and helmet-mounted displays. The integrated flight control indicator provides information regarding crucial flight control parameters in a manner which is readily ascertainable, clear, and unambiguous and which is particularly well suited for use in projected indicators such as heads-up and helmet-mounted displays.

These, as well as other advantages of the present invention will be more apparent from the following description and drawings. It is understood that the changes in the specific structure shown and described may be made within the scope of the claims without departing from the spirit of the invention.

DETAILED DESCRIPTION OF THE PREFERRED EMBODIMENTS

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The integrated flight control indicator of the present invention is illustrated in FIGS. 1–21 which depict three presently preferred embodiments of the invention. FIGS. 1–11 illustrate the first embodiment of the present invention wherein an aircraft symbol having a pitch dot is locked to aircraft centerline. The second embodiment of the present invention is illustrated in FIGS. 12–15 wherein the stationary aircraft symbol comprises a generally horizontal line having a V-groove formed at the center thereof and utilizing a flight path marker to facilitate flight along a desired flight path. The third embodiment of the present invention is illustrated in FIGS. 16–19 wherein a stationary heading and slope indicator cooperates with a moving flight path marker to facilitate use with instrument landing Systems.

Referring now to FIGS. 1–11, the first embodiment of the present invention comprises a sky arc 10, and earth arc 12 cooperating with the sky arc 10 so as to define a circle, and an aircraft symbol 14 having an optional pitch dot 16 preferably centered therein. The aircraft symbol 14 (best shown in FIG. 5) preferably comprises a circle 18 having first 20 and second 22 lines extending horizontally therefrom and third line 24 extending vertically therefrom. The circle 18 is representative of the fuselage of an aircraft, the first 20 and second 22 lines are representative of the wings of the aircraft, and the vertical line 24 is representative of the tail of the aircraft.

A horizon line 26 extends across the circle defined by the sky arc 10 and the earth arc 12, generally defining a cord thereof. The horizon line 26 extends approximately between the intersections of the sky arc 10 and the earth arc 12. First 28 and second 30 pitch-angle index markers extend from the ends of the horizon line 26 to the intersections of the sky arc 10 and earth arc 12.

Figure 7:
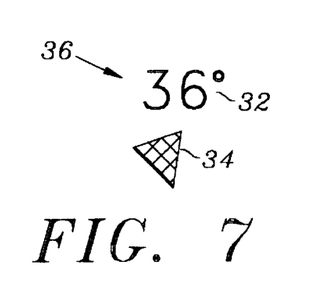
FIG. 7 shows the bank angle numeric display indicating a bank angle of 36 degrees.

With particular reference to FIG. 7, a bank angle indicator 32 comprises a bank angle index mark 34 and a bank angle numeric display 36.

Figure 8:
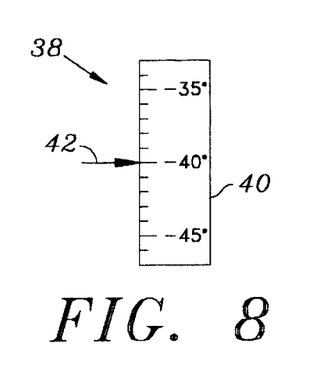
FIG. 8 shows the pitch numeric tape indicator of the integrated flight control indicator of FIGS. 1 and 2.

With particular reference to FIG. 8, a pitch numeric tape 38 comprises a scale 40 and a pointer or index 42 for indicating a particular numerical value upon the scale 40. The scale 40 scrolls in a fashion of contemporary tape readouts.

Figure 9:
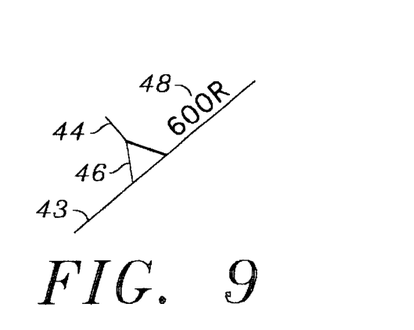
FIG. 9 shows the earth line, radar altitude numeric display, and vertical rate indicator of the integrated flight control indicator of FIGS. 1 and 2.

The symbology of FIG. 9 is actually an altimeter that incorporates a visual expression of the aircraft's relative position to the earth, a function which allows the pilot to set a minimum altitude, and a function which visually warns the pilot when he descends below that minimum. In this sense, it is a terrain avoidance display and may be adapted to manual terrain following by the pilot's use of the information provided or by a pre-programmed software program.

A ground line 43 is formed generally parallel to the horizon line 26 and has a vertical line 44 extending perpendicularly upwardly therefrom. A vertical rate indicator 46 is generally configured as an inverted V and moves up and down with the ground line along vertical line 44 to indicate vertical rate.

Altitude numerical display 48 is formed generally upon ground line 43 and preferably includes either an R to indicate radar altitude or a B to indicate barometric altitude, as selected.

Figure 10:
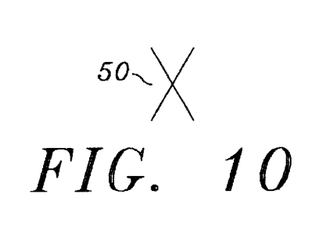
FIG. 10 shows the minimum altitude break symbol.

With particular reference to FIG. 10, minimum altitude break 50 is generally configured as an X and is preferably superimposed over the aircraft symbol 14 to indicate that the aircraft is flying below a minimum desired altitude. Preferably, the minimum altitude break 50 flashes so as to assure that the pilot's attention is captured thereby.

Figure 11:
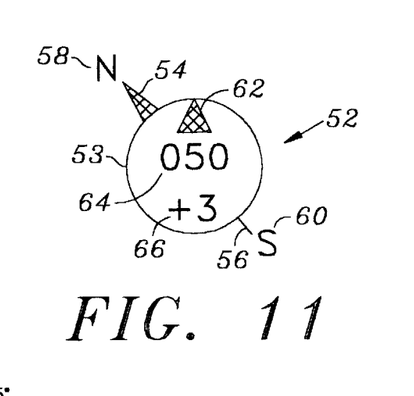
FIG. 11 shows the heading and ground track indicator of FIGS. 1 and 2.

Heading and ground track indicator 52 comprises north index mark 54 and south index mark 56 diametrically opposed about circle 53. An N 58 is formed proximate the north index 54 and a S 60 is located proximate the south index 56. An aircraft heading index 62 remains stationary as the north 54 and south 56 indexes rotate about the circle 53 to indicate the heading of the aircraft. A numerical display 64 of aircraft heading is formed within the circle 53, preferably below the aircraft heading index mark 62. A ground track correction numeric display 66 is formed below the numerical display of the heading 64.

Having described the first embodiment of the integrated flight control indicator of the present invention in detail, it may be beneficial to discuss the operation thereof. The sky arc 10 cooperates with the earth arc 12, so as to provide an immediately recognizable visual indication of pitch. The relative proportion of the length of the sky arc 10 to the earth arc 12 is indicative of the pitch of the aircraft in a manner which mimics actual cockpit observations of the sky and ground.

Figures 1, 2, 3, 4, 5, 6:
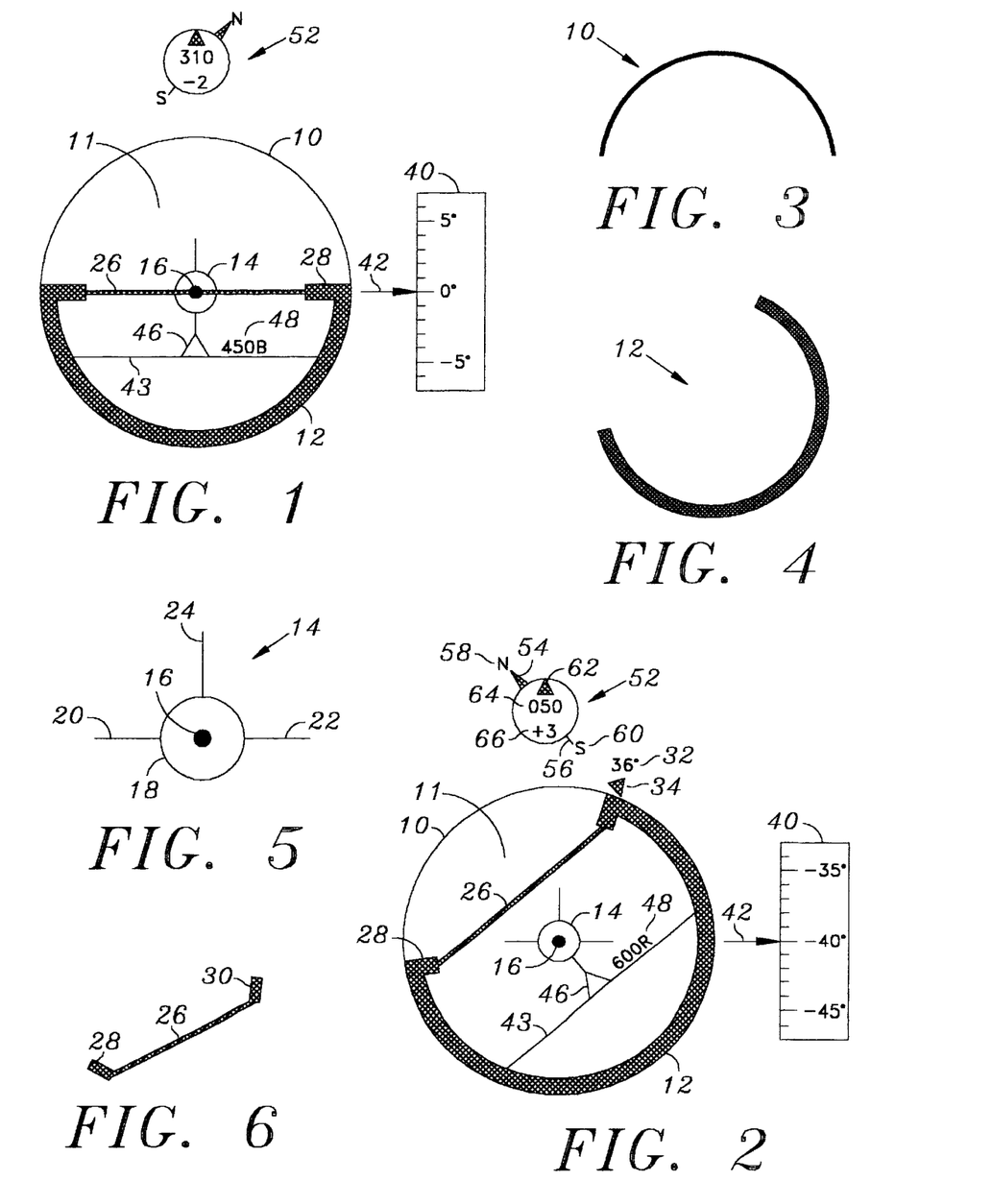
FIG. 1 shows a first embodiment of the integrated flight control indicator of the present invention for an aircraft flying straight and level on a heading of 310 degrees with a ground track of 308 degrees at 450 feet of altitude as measured by the aircraft's barometer altimeter.
FIG. 2 shows the integrated flight control indictor of FIG. 1 for an aircraft banking to the right at 36 degrees and pitched down at −40 degrees on a heading of 50 degrees with a ground track of 53 degrees and flying at 600 feet according to the aircraft's radar altimeter.
FIG. 3 shows the sky arc portion of the integrated flight control indicator of FIGS. 1 and 2.
FIG. 4 shows the earth arc portion of the integrated flight control indicator of FIGS. 1 and 2.
FIG. 5 shows the aircraft symbol and pitch dot of the integrated flight control indicator of FIGS. 1 and 2.
FIG. 6 shows the horizon line of the integrated flight control indicator of FIGS. 1 and 2, having pitch-angle index markers angled upwardly therefrom.

Thus, when the aircraft is flying straight and level, the length of the sky arc 10 is approximately equal to the length of the earth arc 12, as shown in FIG. 1. When the aircraft pitch is down, as when descending, the length of the earth arc 12 becomes greater than the length of the sky arc 10. The greater the downward pitch of the aircraft, the greater the relative proportion of the earth arc 12 to the sky arc 10.

Thus, when the plane is in a nose up attitude, the sky arc varies in length from slightly greater than 180 degrees to 360 degrees and the earth arc varies in length from slightly less than 180 degrees to 0 degrees. Similarly, when the aircraft is in a nose down attitude, the sky arc varies from slightly less than 180 degrees to 0 degrees and the earth arc varies in length from slightly greater than 180 degrees to 360 degrees. When the aircraft is flying straight and level, the sky arc and the earth arc are equal in length, i.e., 180 degrees each. When the aircraft is flying straight up, no earth arc 12 would be visible and the integrated flight control indicator of the present invention would comprise between 360 degrees of sky arc 10. During straight down flight, the sky arc 10 would not be visible and the integrated flight control indicator would comprise 360 degrees of the earth arc 12.

This mimics the sky and earth conditions that a pilot views from the cockpit of an aircraft, wherein during a descent or pitch down attitude, a greater proportion of the ground would be visible as compared to sky and during an ascent or pitch up attitude of the aircraft, a greater proportion of the sky would be visible as compared to the ground. Thus, the combination of the sky arc 10 and ground arc 12 of the present invention provides a natural and intuitive means for indicating pitch.

The sky arc 10 and the earth arc 12 further cooperate to provide a general indication of roll or bank of the aircraft. The positions of the intersections of the sky arc 10 and the earth arc 12 rotate about the circle defined thereby in proportion to the amount and direction of roll of the aircraft. A horizon line extends approximately between these two intersections, so as to provide a more definitive visual indication of roll or bank, as discussed in detail below.

A more precise indication of pitch angle is provided by the pitch numeric tape readout 40, preferably positioned immediately to the right of the circle defined by the sky arc 10 and the earth arc 12. The pitch numeric tape readout 40 displays pitch numerically in a fashion similar to that of a conventional tape readout wherein the numbers scroll up or down, as necessary, and the particular number indicative of pitch is aligned with an index or pointer 42.

As mentioned above, bank or roll can visually be generally determined by the orientation of the intersections of the sky arc 10 and the earth arc 12. However, to provide a more readily discerned indication of bank or roll, a horizon line 26 extends across the circle defined by the sky arc 10 and the earth arc 12. The horizon line 26 extends approximately from one intersection of the sky arc 10 and earth arc 12 approximately to the other intersection thereof. Thus, as the aircraft banks or rolls, the horizon line 26 moves in a direction opposite to that of the bank, as does the true horizon, and the aircraft symbol 14 remains stationary relative to the aircraft, thereby providing an indication of the degree, rate, and direction of bank or roll. Thus, the horizon line 26 moves while the aircraft symbol 14 remains stationary, thereby providing an inside-looking-out representation, as is traditional for aircraft cockpit instrumentation.

A more precise indication of bank or roll is optionally provided by bank angle indicator 32 (FIGS. 2 and 7). The bank angle indicator 32 preferably defaults to the off or undisplayed position. When displayed, an index mark 34 is formed proximate that intersection of the sky arc 10 and Earth arc 12 on the side of the lowermost wing of the aircraft and a numeric display 32 indicative of the number of degrees of bank or roll is provided. Thus, the pilot may readily ascertain the direction and degree of roll or bank.

The aircraft symbol 14 is locked to aircraft centerline such that as the sky arc 10, earth arc 12, and horizon line 26 rotate or move relative thereto. Thus, a readily ascertained visual indication of roll and pitch is provided thereby.

The aircraft symbol 14 will always maintain its orientation relative to the pilot, while those indicia representative of the outside world, i.e., the sky arc 10, the earth arc 12, and the horizon line 26 all rotate relative thereto, in a manner which mimics observations of these items from the cockpit. Thus, the horizon line 26, for example, tilts to the right or left in the same manner as does the true horizon observed from the cockpit. This provides an intuitive and easily understandable representation of the roll of the aircraft.

According to the preferred embodiment of the present invention, the bank index markers 28 and 30 extend from the two ends the horizon line 26 to the two intersections of the sky arc 10 and earth arc 12. The bank angle index markers 28 and 30 intersect the circle defined by the sky arc 10 and earth arc 12 at right angles thereto. The bank angle index markers 28 and 30 remain perpendicular to the sky arc 10 and earth arc 12 regardless of the relative proportions of the sky arc 10 to the earth arc 10 and thus the angle between the horizon line 26 and the bank angle index markers 28 and 30 varies as the pitch of the aircraft varies. This provides a further visual indication of the pitch of the aircraft.

The effect of the bank angle index markers 28 and 30 is to exaggerate the visible indication of pitch angle by reducing the area 11 enclosed by the sky arc 10, horizon line 26, and the bank angle index markers 28 and 30 at a greater rate than would be the case absent the bank angle index markers 28 and 30. That is, the bank angle index markers 28 and 30 reduce the area 11 at a faster rate than would the horizon line 26 alone, as the aircraft increases its pitch angle. This provides a much more dramatic visual indication of increasing pitch angle than would the use of the horizon line 26 alone, thereby readily alerting the pilot to increasing pitch angle. Of course, rapidly decreasing pitch angle is made more apparent, as well.

The optional pitch dot 16 provides a more precise indication of pitch, particularly during straight and level flight when the horizon line 26 is very close to the pitch dot 16. Thus, when the pitch dot 16 is directly superimposed upon the horizon line 26, as shown in FIG. 1, then zero pitch is indicated.

Optionally, the ground line 43, formed generally parallel to the horizon line 26, is representative of the aircraft attitude. Thus, the ground line 43 will move downwardly as the aircraft ascends and will eventually disappear into the earth arc 12 when the aircraft reaches a predetermined altitude. Conversely, the ground line 43 moves upwardly, toward the aircraft symbol 14 as the aircraft descends and will approximately touch the aircraft symbol 14 when the aircraft symbol 14 is approximately at sea level or zero feet of altitude. Thus, the distance between the aircraft symbol 14 and the ground line 43 is generally proportional to the distance between the aircraft itself and the ground. Use of the ground line 43 in this manner facilitates terrain following.

The ground line 43 is typically only displayed when the aircraft descends below a pilot preset altitude. Thus, as the aircraft descends below 2,000 feet, for example, the ground line appears at the bottom of the earth arc 12 and moves upward toward the aircraft symbol 14, along with the vertical rate indicator 46, as the aircraft continues to descend.

Further, according to the preferred embodiment of the present invention, a vertical rate indicator 46 moves vertically, so as to indicate vertical rate. Thus, as the aircraft ascends, the vertical rate indicator 46 and the ground line 43 move farther from the aircraft symbol 14, and as the aircraft descends, the vertical rate indicator 46 and the ground line 43 move closer to the aircraft symbol 14. The vertical rate indicator 46 and the ground line 43 move at a rate representative of the actual vertical rate of the aircraft. The vertical rate indicator 14 always has its base on the ground line 43, i.e., moves along with the ground line 43, and may generally be considered a part thereof,.

The optional numeric display of either the radar altitude or the barometric altitude is formed just above ground line 43, preferably to the right of the vertical rate indicator 46. Either radar altitude, as indicated by an R, or barometric altitude as indicated by a B may be displayed, as desired.

A break-altitude symbol 50, if enabled, will. be superimposed over the aircraft symbol 14 and will flash at any time that the aircraft is below a pilot preset altitude. This pilot preset minimum altitude is generally indicative of the lowest safe altitude at which the pilot has decided the aircraft may fly within a particular area, generally as determined by the height of physical obstructions such as buildings, radio towers, mountains, etc. Thus, a display which quickly draws the pilot's attention is provided thereby. The break-altitude symbol 50 preferably comprises an X and preferably begins to flash when the uppermost tip of the vertical rate indicator 46 first touches the aircraft symbol 14, thereby indicating that a desired minimum altitude has been reached.

The optional heading and ground track indicator 52 provides a readily ascertained indication of both the aircraft's heading and ground track. Thus, as the aircraft changes direction, the numeric display of aircraft heading 64 changes, as well as the ground track numeric indication 66. Further, the north index 54 (best shown in FIG. 11) coupled with south index 56, as well as the N 58 and S 60 symbols, rotate about the heading and ground track indicator 52 to provide a non-numeric visual indication of heading. This indication is observed by merely noting the relative position of the aircraft centerline index 62 relative to the north index 54. Rotation of the north 54 and south 56 indexes is particularly useful in determining turn rate since the rate at which the north 54 and south 56 indexes rotate about the heading and ground track indicator 52 is proportional to the actual turn rate of the aircraft.

Figure 12:
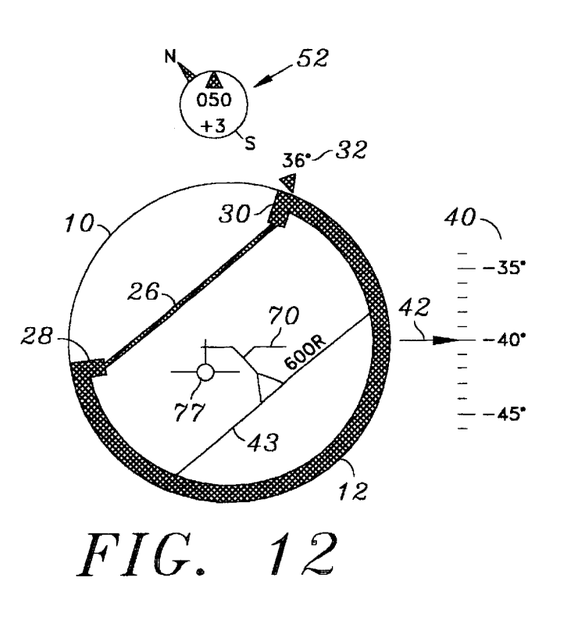
FIG. 12 shows a second embodiment of the integrated flight control indicator of the present invention for an aircraft banking at 36 degrees to the right and pitched down at −40 degrees, having a heading of 50 degrees and a ground track of 53 degrees and also showing a stationary aircraft symbol locked to the aircraft centerline and a flight path marker to the left of and lower than the stationary aircraft symbol, so as to provide an indication of the deviation of the aircraft from the desired flight path.
Figure 13:
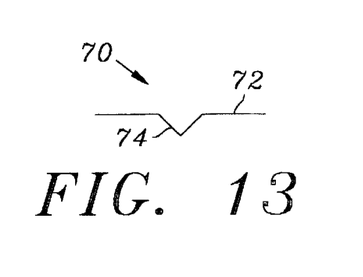
FIG. 13 shows the stationary aircraft symbol of FIG. 12.

Referring now to FIG. 12–15, a second embodiment of the integrated flight control indicator of the present invention is configured to utilize terrain following/avoidance equipment. According to the second embodiment of the present invention, a stationary aircraft symbol 70 is locked to the aircraft centerline and preferably comprises a generally horizontal line 72 having a V-notch 74 formed proximate the center thereof (as shown in FIG. 13).

As in the first embodiment of the present invention, a pitch numeric tape 40 is utilized to indicate pitch angle. According to the second embodiment of the present invention, the box surrounding the numeric tape is eliminated. Those skilled in the art will appreciate that various different representations of the pitch numeric tape are likewise suitable.

Figure 14:
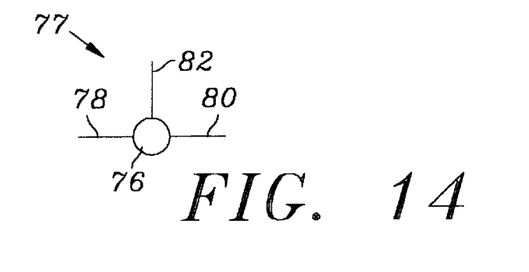
FIG. 14 shows the flight path marker of FIG. 12.

With particular reference to FIG. 14, a flight path marker 77 generally comprises a small circle 76 from which first 78 and second 80 horizontal lines extend, from either side thereof, and from which vertical line 82 extends, so as to generally resemble an aircraft. The flight path marker 77 moves about within the circle defined by the sky arc 10 and earth arc 12 as discussed below.

Figure 15:
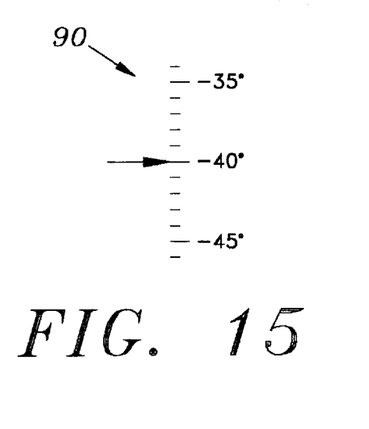
FIG. 15 shows the pitch numeric tape of FIG. 12.

With particular reference to FIG. 15, the pitch numeric tape readout 90 may be formed to either have a border, or not have a border, as discussed above.

Having described the second embodiment of the present invention, it may be beneficial to discuss the operation thereof. According to the second embodiment of the present invention, terrain following/avoidance is facilitated by providing a stationary aircraft symbol 70 which is locked to aircraft centerline and a moving flight path marker 77 which is damped and constrained to stay within the circular boundary defined by the sky arc 10 and the earth arc 12. The flight path marker 77 indicates the actual flight path of the aircraft so as to facilitate terrain following/avoidance. The pilot merely maneuvers the aircraft so as to align the flight path marker 77 with the stationary aircraft symbol 70. When the aircraft symbol 70 is aligned with the flight path marker 77, the aircraft is on course.

As shown in FIG. 12, the aircraft is low and to the left as compared to the desired flight path. Thus, the pilot merely maneuvers the aircraft up and to the right such that the flight path marker 77 moves closer to the stationary aircraft symbol 70, thereby attaining the desired flight path.

The flight path marker (FPM) is present in all variations of the sky arc symbology. It is always constrained within the circle formed by the sky arc and the earth arc. Within the circle, it is always free to move. The flight path marker can be used in a number of ways, but its defined purpose is to show the pilot the actual flight path of the aircraft relative to the horizon. That information may, of course, be applied in different ways and used for various purposes under certain flight conditions. Often, it is not used for anything in particular by the pilot.

Referring now to FIGS. 16–19, a third embodiment of the integrated flight control indicator of the present invention is configured to facilitate use with Instrument Landing Systems. According to the third embodiment of the present invention, the pitch numeric tape readout is replaced with an angle-of-attack numeric tape readout 96 (also shown in FIG. 17), wherein the index or pointer preferably comprises a symbol representative of the Greek letter alpha 98.

Additionally, the stationary aircraft symbol 70 of the second embodiment of the present invention is replaced with a heading and glide slope indicator 100 (also shown in FIG. 19) which preferably comprises a circle having first 102 and second 104 lines extending horizontally therefrom and a single line 106 extending vertically therefrom. A moving flight path marker 77, such as that utilized in all embodiments of the present invention, indicates deviation of the aircraft from the desired flight path. An optional minimum approach altitude indicator 110 is incorporated into the glide scope indicator 100 and has a minimum approach altitude numeric display 112 formed proximate thereto. Preferably, the distance between the minimum approach altitude indicator 110 and the tip of the inverted V 46 is representative of the aircraft's altitude above the minimum altitude. Thus, when the tip of the inverted V 46 touches the minimum approach altitude indicator 110, the aircraft is at minimum approach altitude.

Figure 16:
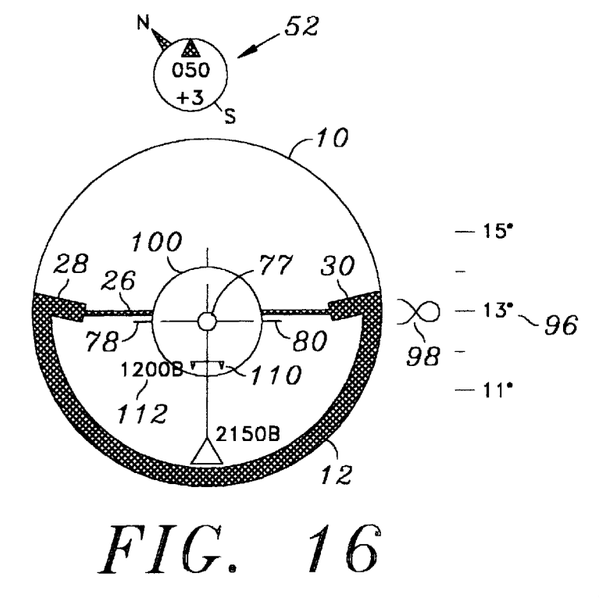
FIG. 16 shows a third embodiment of the integrated flight control indicator of the present invention for an aircraft having zero degrees of bank and descending at the desired rate, having an angle-of-attack of 13 degrees, on a heading of 50 degrees and ground track of 53 degrees, passing through 2,150 feet as measured by the barometric altimeter, and indicating a minimum approach altitude of 1,200 feet barometric.
Figure 17:
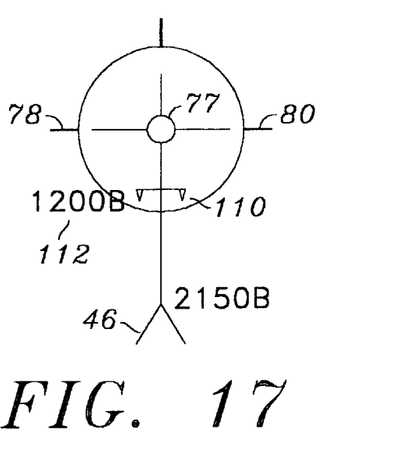
FIG. 17 shows the Instrument Landing System symbol of FIG. 16 including the stationary heading and glide slope indicator, the moving flight path marker, the minimum altitude indicator, and the rate indicator.
Figure 18:
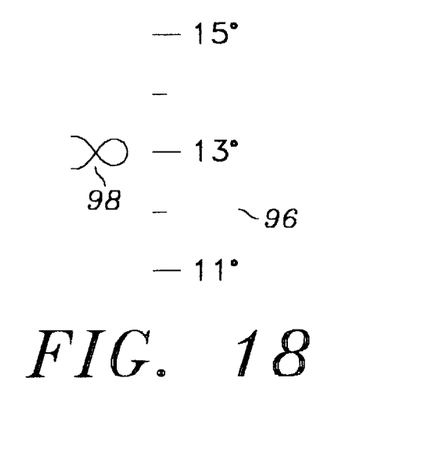
FIG. 18 shows the angle-of-attack tape of FIG. 16.

As shown in FIG. 16, the pilot is at sufficient attitude that the ground line 43 has disappeared below the earth arc 12. The actual altitude of the aircraft as indicated by the barometric altimeter is 2,150 feet and the minimum approach altitude for an instrument landing approach is 1,200 feet. The aircraft is on course and descending at the desired rate.

Optionally, the ground track indicator 52 displays ground track instead of heading and cross-wind instead of ground track correction.

Having described the third embodiment of the integrated flight control indicator of the present invention, it may be beneficial to describe the operation thereof. To facilitate use of the integrated flight control indicator of the present invention with Instrument Landing Systems, the aircraft symbol 70 of the second embodiment of the present invention is replaced with a stationary heading and glide slope indicator 100 as discussed above. Thus, to utilize an Instrument Landing System, the pilot merely maneuvers the aircraft so as to maintain the flight path marker 77 within the heading and glide slope indicator 100 and such that the left 102 and right 104 index markers are generally aligned with the left 78 and right 80 vertical lines extending from the flight path marker 77, so as to indicate that the aircraft is level or descending at the correct rate. Observation of the minimum approach altitude indicator 110 and the point of the inverted V 46 shows the pilot his altitude relative to the minimum permissible descent altitude below which the pilot either lands visually or initiates a missed approach procedure.

Figure 20:
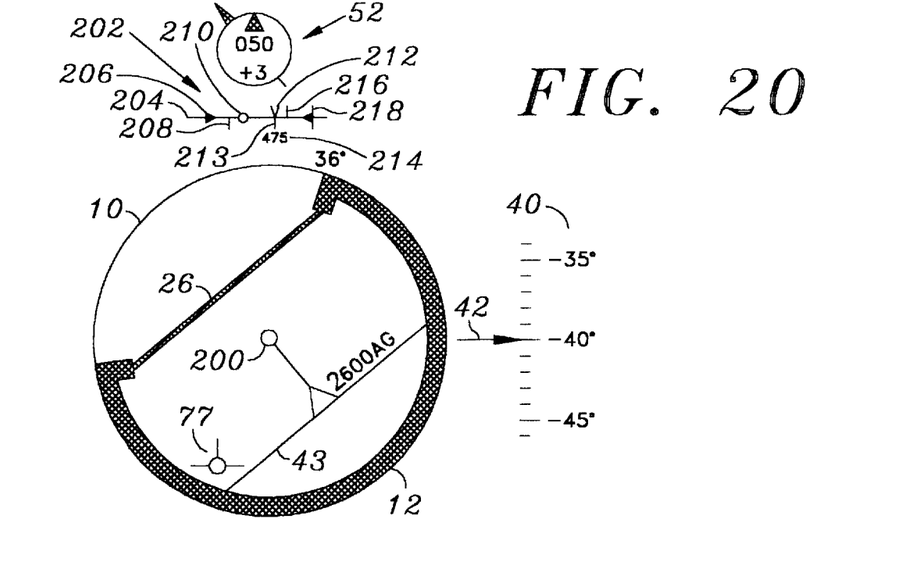
FIG. 20 shows an integrated flight control indicator having an optional air speed indicator added thereto.

Referring now to FIG. 20, a simple circle may alternatively be utilized as the aircraft symbol 200. Further, rather than using a R to indicate radar altitude, the letters AG, standing for above ground, may be utilized. This provides more distinct symbology with respect to the B utilized to indicate barometric altitude, so as to mitigate the potential for confusion between the A and B, which are somewhat similar in appearance.

An optional air speed indicator 202 comprises a generally horizontal line 204 having a length generally representative of the maximum speed at which the aircraft is likely to travel. A stall indicator 206, indicated by a right-pointing arrow is disposed at the left side of the line 204, i.e., in the low speed region thereof, so as indicate the speed at which a stall will occur in view of the present flight parameters, e.g., pitch angle, roll, air speed, altitude, etc., of the aircraft.

A maximum endurance indicator 208, represented by a right-angle line descending from the air speed line 204, indicates the speed at which the aircraft is to be flown so as to remain in the air for the maximum length of time. In a similar fashion, a maximum range indicator 216 indicates the speed at which the aircraft is to be flown so as to attain the maximum range. A left-pointing arrow defines the velocity not to exceed symbol 218, which is representative of the maximum velocity which the aircraft is structurally designed to withstand. The maximum turn rate is indicated by a circle which defines the maximum turn rate indicator 210. The present air speed symbol is comprised of the V 212 and downward extending line 213. optionally, a numerical display 214 of the present air speed is provided just below the line 213. At the pilot's option, any or all of the following may be disabled so as to de-clutter the display as desired: the maximum endurance indicator 208, the maximum range indicator 216 and the maximum turn rate indicator-210.

Thus, the present air speed indicator 212 moves horizontally along the line 204, so as to indicate present air speed. Indicated air speed increases as the present air speed indicator 212 moves from the left to the right. The optional air speed indicator 202 of the present invention provides a quick indication of the present air speed with respect to those particular air speeds which are considered critical to flight, e.g., stall speed, max turn rate, max range, max endurance, and velocity not to exceed.

Figure 19:
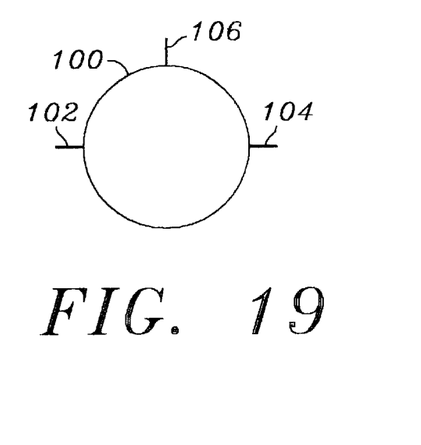
FIG. 19 shows the heading and glide slope indicator of FIG. 16.

The heading and glide slope indicator of FIG. 19 is generally stationary, but may reposition itself, as required by the instrument landing approach parameters.

Figure 21:
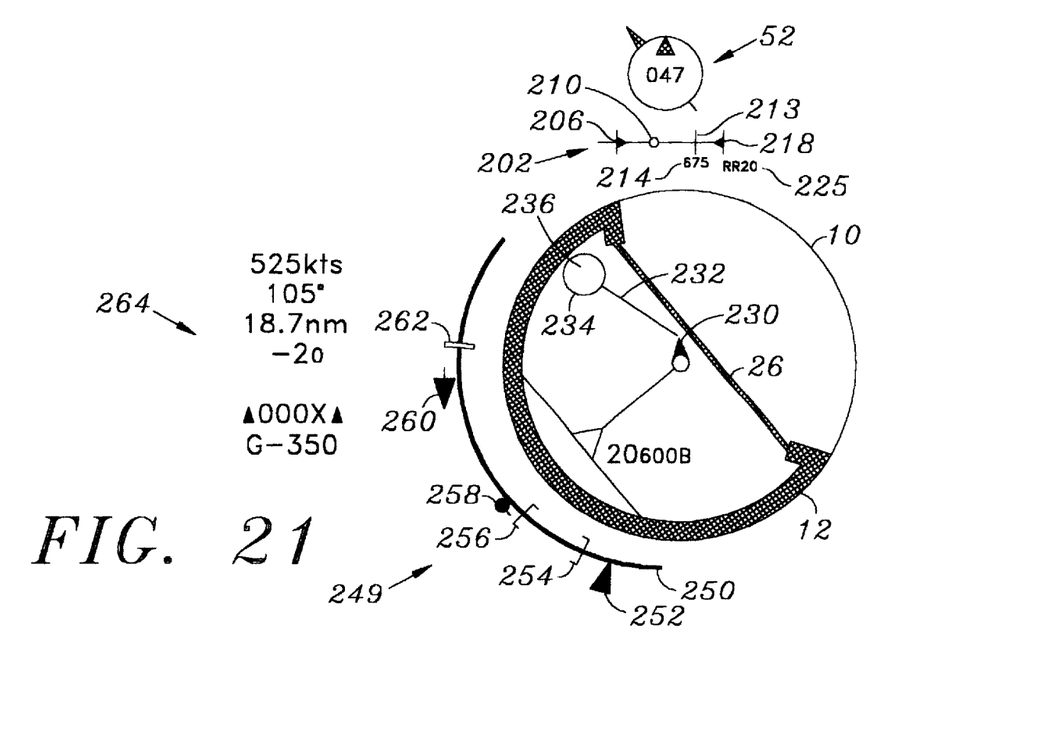
FIG. 21 shows an integrated flight control indicator having an optional integrated fire control indicator added thereto.

Referring now to FIG. 21, an optional fire control indicator 249 comprises an arc 250, preferably disposed immediately to the left of the circle defined by the sky arc 10 and the earth arc 12. The optional fire control indicator 249 provides various indications which aid a crew member in the selection and use of aircraft weaponry. The integrated fire control indicator 249 comprises an arc 250 upon which are displayed the pilot's aircraft 260 and a targeted aircraft 252. The distance along the arc 250 is proportional to the distance of the targeted aircraft 252 from the pilot's own aircraft 260, and is also proportional to the distance of a missile underway 258 from both the pilot's aircraft 260 and the targeted aircraft 252. Thus, the missile underway symbol 258 moves closer to the targeted aircraft symbol 252 as the actual missile approaches its target.

According to the preferred embodiment of the present invention, range no escape, i.e., that range within which a hit is substantially guaranteed, is indicated by an open bracket 256, and the minimum range for firing the weapon, i.e., the minimum safe distance from the targeted aircraft for firing the selected weapon, is indicated by a closed bracket 254. The maximum firing range is indicated by the double line 262. All the symbols on the arc 250 are dynamic and move in concert with the dynamics of the fire control situation. As those skilled in the art will appreciate, various different symbols may be utilized to indicate different types of missiles as well as whether or not those missiles are presently selected or underway and may also be utilized to indicate the present status thereof, e.g., radar active, etc.

Optionally, an alpha-numeric display 264 of pertinent fire control information is additionally provided, preferably immediately to the left of the fire control arc 250. This information preferably comprises the speed of the targeted aircraft, i.e., 525 nautical miles per hour, for example; the bearing of the targeted aircraft relative to the aircraft, 105 degrees, for example; the range from the aircraft to the targeted aircraft, 18.7 nautical miles, for example; and the altitude of the targeted aircraft relative to the aircraft, minus 2,000 feet, for example.

Weapons status is preferably also indicated in the alpha-numeric display 264. For example, infrared missiles are preferably indicated by solid triangles, radar missiles by circles, and a fired missile indicated by an X. The color of the symbol, the triangle, for example, may be utilized to indicated whether or not that missile has been selected and whether or not the missile is armed. The number of rounds remaining for a gun, as indicated by G-350 (indicating 350 rounds remaining), may also optionally be provided.

According to the preferred embodiment of the present invention, a range/bearing line is also optionally provided 232. The range/bearing line comprises a range line 232, the length of which is indicative of the range to the target and the angle of which is indicative of the bearing of the target relative to the aircraft. The location of the target is provided by circle 234 and a symbol may optionally be enclosed within the interior 236 of the circle which is indicative of the type of target. The pointer 230 represents the heading of the aircraft so as to provide a bearing reference for the range line 232. Additionally, the circle formed by the sky arc and the earth arc may be used as a range ring. Range from the center of the circle to its edge is indicated in nautical miles by a numeric 265.

According to the preferred embodiment of the present invention, various features of the integrated flight control indicator may be deactivated or turned off, so as to reduce clutter, and thereby more readily facilitating perception of the desired indications for a particular type of use. For example, the pitch tape may be disabled and pitch information then obtained directly from the sky arc portion of the display, if desired.

The integrated flight control indicator of the present invention can be reduced in size substantially and still provide easily perceived flight control indications. Thus, the flight control indicator may be shrunk, so as to minimize interference with a pilot's field of view. Additionally, the availability of such a reduced size integrated flight control indicator facilitates its use in helmet-mounted displays, wherein the area available for such a display is strictly limited.

A computer preferably receives inputs from various different sensor devices, i.e., a pitch sensor, a roll sensor, etc., and generates a display which is representative of the outputs of said sensors in response to the received inputs. Those skilled in the art will appreciate that various different configurations of such computerized data acquisition and display system are suitable for use in the present invention.

Additionally, those skilled in the art will appreciate that various different types of displays, e.g., CRT, LED, projection, etc., are suitable for use in the present invention.

Use of the integrated flight control indicator of the present invention makes changes, i.e., additions, deletions, and modifications, of the symbology thereof easy to accomplish. For example, the nature of a symbol may easily be changed by merely modifying the computer program utilized to generate the symbol. Further, as the ability to acquire additional information increases due to improvements in technology, that new information may easily be integrated into the present invention and displayed by merely modifying the software associated therewith.

Use of the integrated flight control indicator of the present invention eliminates the need for a pilot to continuously scan a control panel, while simultaneously attempting to maintain surveillance of the surrounding air space. Rather, all of the necessary flight control indicators are contained within a small space which may be placed to the side of the pilot's normal field of view, so as not to interfere substantially therewith.

It is understood that the exemplary integrated flight control indicator of the present invention described herein and shown in the drawings represents only a presently preferred embodiment of the invention. Indeed, various modifications and additions may be made to such embodiments without departing from the spirit and scope of the invention.

What is claimed is:

1. A method of representing visual information indicative of aircraft flight parameters, the method comprising the steps of:

a) displaying a sky arc on a display;
   b) displaying an earth arc visually distinguishable from said sky arc, said sky arc and said earth arc cooperating to generally define a circle, the relative lengths of said sky arc and said earth arc indicating pitch of the aircraft, the sky arc having a length greater than a length of the earth arc to indicate pitch up and the earth arc having a length greater than the length of the sky arc to indicate pitch down;
   c) displaying a horizon line extending approximately between two intersections of said sky arc and said earth arc so as to provide a visual indication of the roll of the aircraft; and
   d) displaying bank angle markers extending radially inward from two intersections of said sky arc and said earth arc to two ends of said horizon line, the angle between said bank angle markers and said horizon line varying with the pitch of the aircraft such that during level flight, the bank angle markers are co-linear therewith, during pitch down the bank angle markers angle up from said horizon line, and during pitch up, the bank angle markers angle down from said horizon line.

2. The method of claim 1 further comprises displaying a numerical display of a bank angle of the aircraft formed proximate one of the bank angle markers.

3. A method of representing visual information indicative of aircraft flight parameters, the method comprising the steps of:

a) displaying a sky arc on a display;
   b) displaying an earth arc visually distinguishable from said sky arc, said sky arc and said earth arc cooperating to generally define a circle, the relative lengths of said sky arc and said earth arc indicating pitch of the aircraft, the sky arc having a length greater than a length of the earth arc to indicate pitch up and the earth arc having a length greater than the length of the sky arc to indicate pitch down; and
   c) displaying a break-altitude symbol formed within said circle defined by said sky arc and said earth arc to indicate that the aircraft has descended below a preset minimum altitude, the break-altitude symbol being configured to overlay an aircraft symbol.

4. The method of claim 3, wherein said break-altitude symbol comprises an X.

5. The method of claim 4, wherein said X flashes.

6. The method of claim 3, wherein said break-altitude symbol remains and continues to flash until the aircraft ascends above the preset minimum altitude.

7. The method of claim 3 further comprises displaying an air speed indicator, said air speed indicator comprising:

i) a line having a length representative of a maximum speed of the aircraft; and
   ii) a present air speed symbol which moves along said line, the position of the present air speed symbol along said line indicating air speed of the aircraft.

8. The method of claim 7 further comprises displaying a stall speed symbol disposed along said line, the position of the stall speed symbol along said line indicating a stall speed of the aircraft.

9. The method of claim 7 further comprises displaying a maximum endurance symbol disposed along said line, the position of the maximum endurance symbol along said line indicating a maximum endurance speed of the aircraft.

10. The method of claim 7 further comprises displaying a velocity not to exceed symbol along said line, the position of the velocity not to exceed symbol along said line indicating a velocity not to exceed that of the aircraft.

* * * * *